(12) United States Patent
Yoshikawa et al.

(10) Patent No.: US 10,479,871 B2
(45) Date of Patent: Nov. 19, 2019

(54) FIBER STRUCTURE FOR FIBER REINFORCED COMPOSITE MATERIAL, METHOD FOR MANUFACTURING FIBER STRUCTURE FOR FIBER REINFORCED COMPOSITE MATERIAL, AND FIBER REINFORCED COMPOSITE MATERIAL

(71) Applicant: KABUSHIKI KAISHA TOYOTA JIDOSHOKKI, Kariya-shi, Aichi-ken (JP)

(72) Inventors: Genki Yoshikawa, Kariya (JP); Ryuta Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 1 day.

(21) Appl. No.: 15/763,578

(22) PCT Filed: Sep. 14, 2016

(86) PCT No.: PCT/JP2016/077169
§ 371 (c)(1),
(2) Date: Mar. 27, 2018

(87) PCT Pub. No.: WO2017/057002
PCT Pub. Date: Apr. 6, 2017

(65) Prior Publication Data
US 2018/0355128 A1    Dec. 13, 2018

(30) Foreign Application Priority Data

Oct. 2, 2015 (JP) ................. 2015-196884

(51) Int. Cl.
*B29C 70/12* (2006.01)
*C08J 5/00* (2006.01)
(Continued)

(52) U.S. Cl.
CPC .............. *C08J 5/005* (2013.01); *B29C 70/14* (2013.01); *C08J 5/06* (2013.01); *D02J 1/18* (2013.01);
(Continued)

(58) Field of Classification Search
CPC ......... Y10T 428/213; Y10T 428/24124; Y10T 428/24132; B29C 70/14; F16D 69/026; F16D 69/023
See application file for complete search history.

(56) References Cited

U.S. PATENT DOCUMENTS

| 6,585,842 B1 | 7/2003 | Bompard et al. |
| 2007/0023139 A1 | 2/2007 | Bruyere et al. |
| 2007/0026215 A1 | 2/2007 | Bruyere et al. |

FOREIGN PATENT DOCUMENTS

| EP | 0 721 835 A2 | 7/1996 |
| JP | 50-160564 A | 12/1975 |

(Continued)

OTHER PUBLICATIONS

International Search Report of PCT/JP2016/077169 dated Dec. 13, 2016.

(Continued)

*Primary Examiner* — Alexander S Thomas
(74) *Attorney, Agent, or Firm* — Sughrue Mion, PLLC

(57) ABSTRACT

A fiber structure for a fiber-reinforced composite material includes a section in which a width varies continuously along a central axis in a plan view. In a section in which the width increases continuously along the central axis, discontinuous fibers are aligned radially along the central axis, and both a thickness of the fiber structure and a density of the discontinuous fibers are uniform.

3 Claims, 4 Drawing Sheets

(51) Int. Cl.
    *C08J 5/06*           (2006.01)
    *D04H 1/74*          (2006.01)
    *D02J 1/18*           (2006.01)
    *B29C 70/14*         (2006.01)
    *D02J 1/22*           (2006.01)
    *D04H 1/645*        (2012.01)

(52) U.S. Cl.
    CPC .............. *D02J 1/225* (2013.01); *D04H 1/645* (2013.01); *D04H 1/74* (2013.01); *B29K 2995/0091* (2013.01); *D10B 2505/02* (2013.01); *Y10T 428/24124* (2015.01); *Y10T 428/24132* (2015.01)

(56) References Cited

FOREIGN PATENT DOCUMENTS

| | | |
|---|---|---|
| JP | 61-031739 A | 2/1986 |
| JP | 62-147509 U | 9/1987 |
| JP | 06-137103 A | 5/1994 |
| JP | 2007-063738 A | 3/2007 |
| JP | 2013-087204 A | 5/2013 |
| JP | 2015-030959 A | 2/2015 |

OTHER PUBLICATIONS

International Preliminary Report on Patentability with translation of Written Opinion dated Apr. 3, 2018, issued by the International Searching Authority in application No. PCT/JP2016/077169.
Communication dated Sep. 19, 2018 from the European Patent Office in counterpart Application No. 16851176.4.

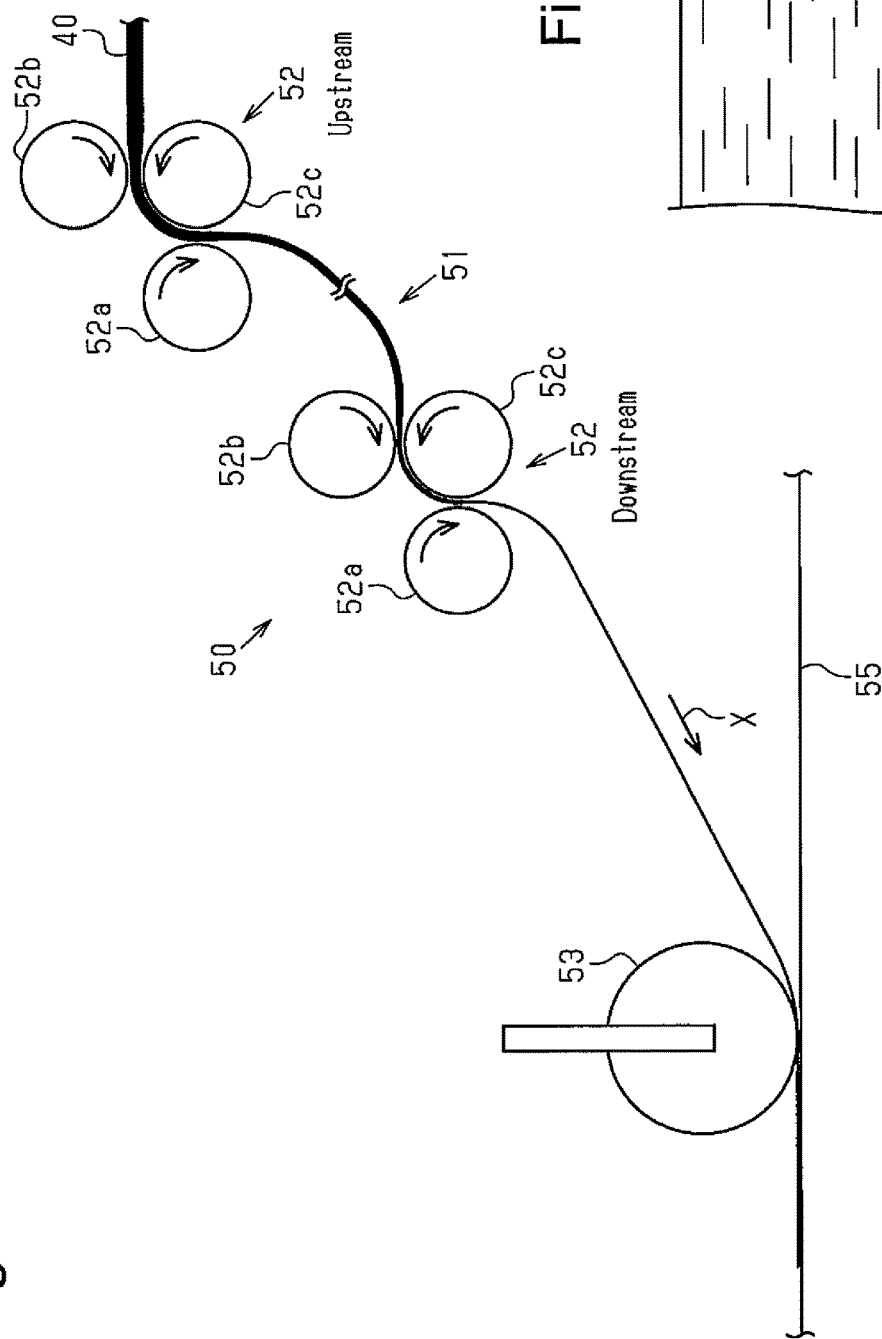
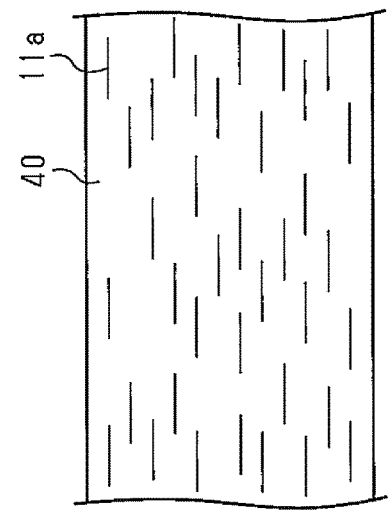

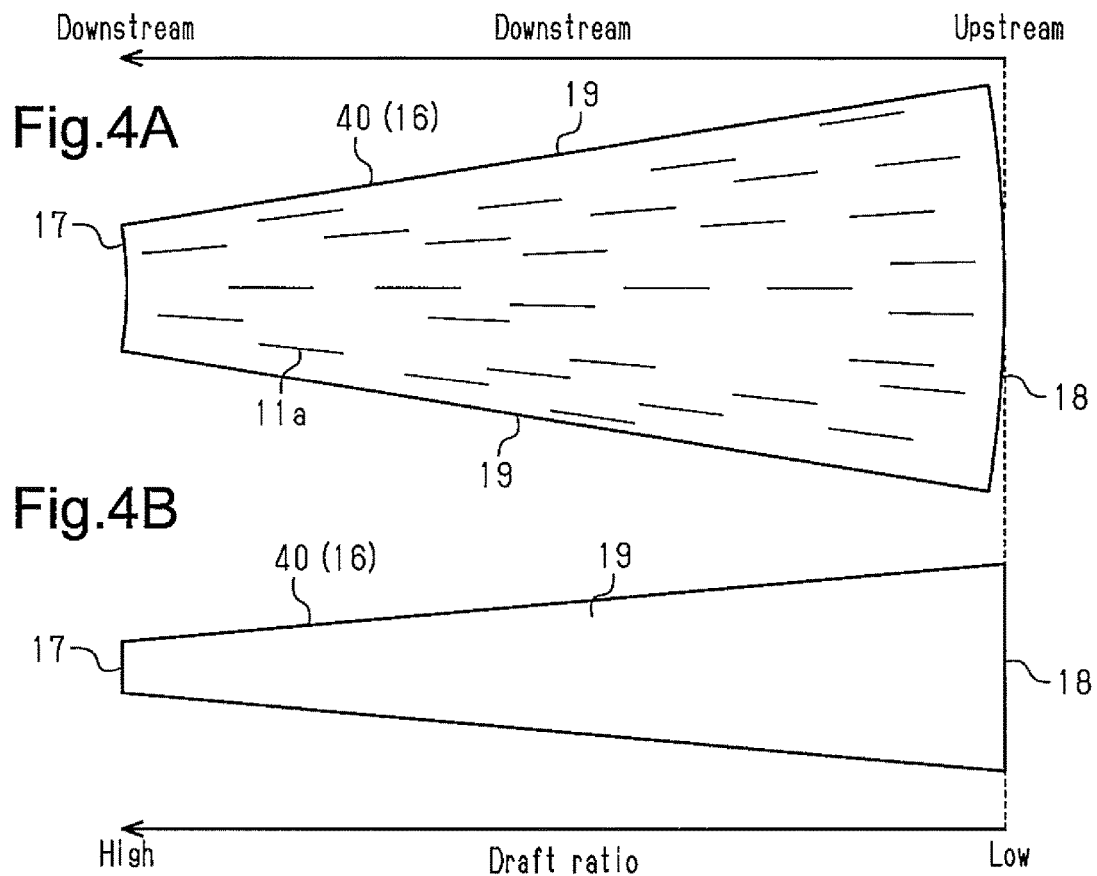
Fig.4A
Fig.4B
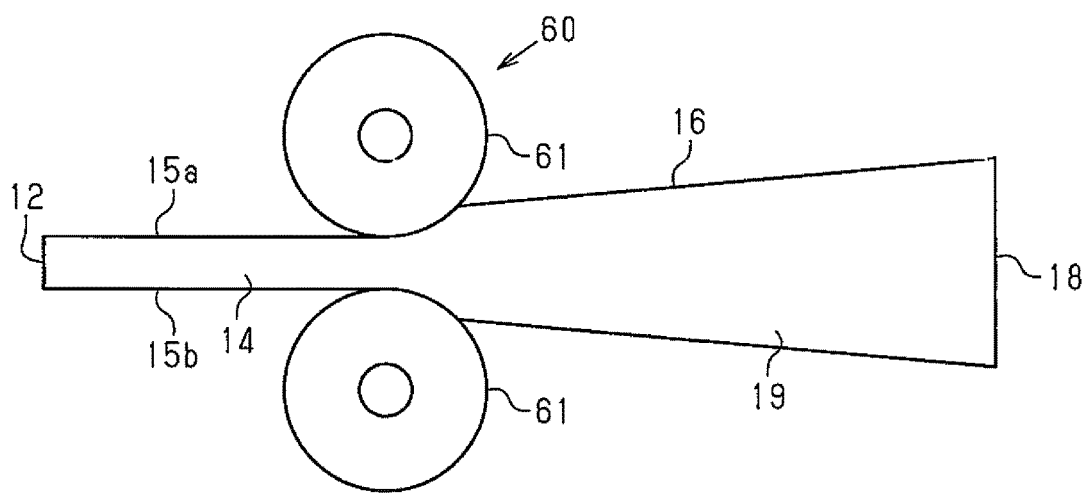
Fig.5

FIBER STRUCTURE FOR FIBER REINFORCED COMPOSITE MATERIAL, METHOD FOR MANUFACTURING FIBER STRUCTURE FOR FIBER REINFORCED COMPOSITE MATERIAL, AND FIBER REINFORCED COMPOSITE MATERIAL

CROSS REFERENCE TO RELATED APPLICATIONS

This application is a National Stage of International Application No. PCT/JP2016/077169 filed Sep. 14, 2016, claiming priority based on Japanese Patent Application No. 2015-196884 filed Oct. 2, 2015.

TECHNICAL FIELD

The present invention relates to a fiber structure for a fiber-reinforced composite material, a method for manufacturing a fiber structure for a fiber-reinforced composite material, and a fiber-reinforced composite material.

BACKGROUND ART

A fiber-reinforced composite material, which is used as a light, strong material, is a composite of a fiber structure and a plastic matrix, for example. Thus, a fiber-reinforced composite material has physical properties (mechanical properties) superior to the matrix. A fiber-reinforced composite material may be used as an impact absorber, which is compressed and broken in the direction of the impact load to absorb the impact energy.

For example, a fiber-reinforced composite material having a sectoral shape including arcuate sections in a plan view may be used as an impact absorber. Such a fiber-reinforced composite material may include a fiber structure, an example of which is disclosed in Patent Document 1. Patent Document 1 discloses a fiber element having a sectoral shape in a plan view. The fiber element is fixed to the surface of the fiber structure when forming the preform.

As shown in FIG. 6, a fiber element 80 includes a first arcuate section 81 at one end in the longitudinal direction and a second arcuate section 82 at the other end. The length of the arc of the first arcuate section 81 is less than that of the second arcuate section 82. The fiber element 80 is shaped such that the width increases continuously from the first arcuate section 81 to the second arcuate section 82.

In Patent Document 1, the fiber element 80 is passed through a variable throat 83 shown in FIG. 7 so that the fiber element 80 obtains a width that varies continuously. The variable throat 83 includes a cylindrical bar 84 and circular plates 85 fixed to the opposite ends of the bar 84. Each circular plate 85 has a thickness that varies continuously conforming to the circumference of the bar 84. Thus, the width of the opening of the passing section 86 between the circular plates 85 also varies continuously conforming to the circumference of the bar 84. The fiber element 80 having a uniform width is passed through the passing section 86 of the variable throat 83, resulting in the fiber element 80 having a width that varies continuously.

However, when the width of the fiber element 80 is changed by passing the fiber element 80 through the passing section 86 as described above, the thickness of a section of the fiber element 80 having a smaller width is greater than the thickness of a section having a greater width. The alignment of fibers varies as the width of the fiber element 80 varies. Thus, the physical properties of the fiber structure tend to vary from the first arcuate section 81 toward the second arcuate section 82.

PRIOR ART DOCUMENT

Patent Document

Patent Document 1: Japanese Laid-Open Patent Publication No. 2007-63738

SUMMARY OF THE INVENTION

Problems that the Invention is to Solve

It is an objective of the present invention to provide a fiber structure for a fiber-reinforced composite material, a method for manufacturing a fiber structure for a fiber-reinforced composite material, and a fiber-reinforced composite material, which limit variations in the physical properties of a section in which the width of the fiber element varies continuously.

Means for Solving the Problems

To achieve the foregoing objective, a first aspect of the present invention provides a fiber structure for a fiber-reinforced composite material, which includes a fiber structure of discontinuous fibers and matrix resin impregnated into the fiber structure. The fiber structure includes a section in which a width varies continuously along a central axis in a plan view. In a section in which the width increases continuously along the central axis, discontinuous fibers are aligned radially along the central axis, and both a thickness of the fiber structure and a density of the discontinuous fibers are uniform.

To achieve the foregoing objective, a second aspect of the present invention provides a method for manufacturing a fiber structure for a fiber-reinforced composite material, which includes a fiber structure of discontinuous fibers and matrix resin impregnated into the fiber structure. The fiber structure includes a section in which a width varies continuously along a central axis in a plan view. In a section in which the width increases continuously along the central axis, discontinuous fibers are aligned radially along the central axis, and both a thickness of the fiber structure and a density of the discontinuous fibers are uniform. When a fiber bundle, which has a uniform width and in which the discontinuous fibers are aligned, is stretched using a drafting apparatus having a plurality of roller groups, a draft ratio of the drafting apparatus is varied continuously such that a thickness of the fiber bundle varies continuously along the central axis to form a preform, and the preform is then pressed only in a thickness direction such that the preform has a uniform thickness.

To achieve the foregoing objective, a third aspect of the present invention provides a fiber-reinforced composite material including the above-described fiber structure and matrix resin impregnated into the fiber structure.

BRIEF DESCRIPTION OF THE DRAWINGS

FIG. 3A is a schematic view of a drafting apparatus.

FIG. 3B is a plan view of a fiber bundle.

FIG. 4A is a plan view of a preform.

FIG. 4B is a side view of the preform.

FIG. 5 is a schematic view showing how a press presses the preform.

MODES FOR CARRYING OUT THE INVENTION

Referring to FIGS. 1 to 5, a fiber structure for a fiber-reinforced composite material, a method for manufacturing a fiber structure for a fiber-reinforced composite material, and a fiber-reinforced composite material according to one embodiment will now be described.

Figure 1:
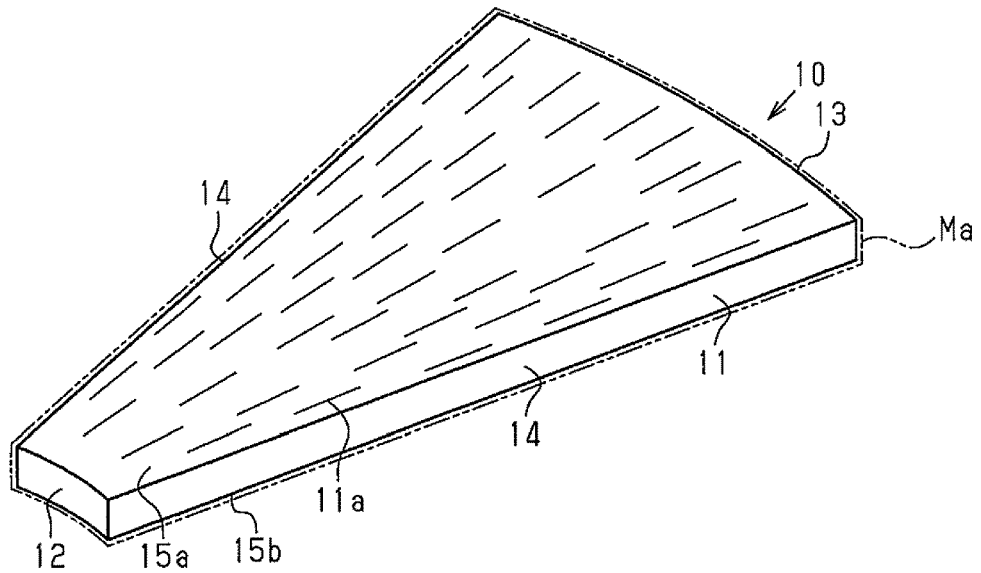
FIG. 1 is a perspective view showing a fiber structure and a fiber-reinforced composite material of one embodiment of the present invention.

Referring to FIG. 1, a fiber-reinforced composite material 10 is formed by impregnating matrix resin Ma into a fiber structure 11, which serves as a reinforcing base.

The fiber structure 11 has a sectoral shape in a plan view. The fiber structure 11 forms a part of a sector and includes a first arcuate section 12 at one end in the longitudinal direction and a second arcuate section 13 at the other end. The length of the arc of the second arcuate section 13 is greater than that of the first arcuate section 12.

Figure 2A:
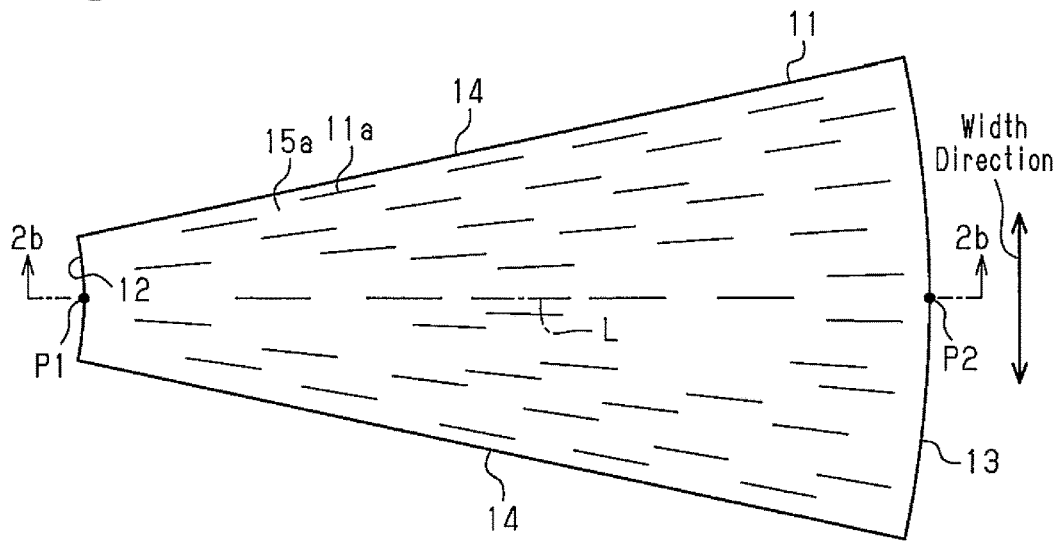
FIG. 2A is a plan view of the fiber structure.

As shown in FIG. 2A, the straight line connecting the center point P1 of the first arcuate section 12 and the center point P2 of the second arcuate section 13 serves as a central axis L of the fiber structure 11. The fiber structure 11 has an arcuate section at each end along the central axis L. The fiber structure 11 includes a pair of sides 14 connecting the first arcuate section 12 to the second arcuate section 13.

The surface surrounded by the first arcuate section 12, the second arcuate section 13, and the pair of sides 14 in a plan view is a top surface 15a of the fiber structure 11. The surface surrounded by the first arcuate section 12, the second arcuate section 13, and the pair of sides 14 in a bottom view is a bottom surface 15b of the fiber structure 11. A direction parallel to a straight line connecting the top surface 15a to the bottom surface 15b with the shortest distance is defined as the thickness direction of the fiber structure 11. The dimension in the thickness direction of the fiber structure 11 is the thickness. A direction that is parallel to the top surface 15a and the bottom surface 15b and perpendicular to the central axis L is defined as the width direction of the fiber structure 11. The dimension in the width direction of the fiber structure 11 is the width of the fiber structure 11. The fiber structure 11 is shaped so that the width increases continuously from the first arcuate section 12 to the second arcuate section 13 along the central axis L in a plan view. Accordingly, the width of the top surface 15a and the bottom surface 15b varies continuously along the central axis L of the fiber structure 11. The top surface 15a and the bottom surface 15b are surfaces whose width varies continuously along the central axis L.

The fiber structure 11 includes discontinuous fibers 11a, which are aligned radially about the first arcuate section 12 and along the sides 14. The discontinuous fibers 11a near the central axis L extend along the central axis L. The discontinuous fibers 11a near one of the sides 14 extend along this side 14. The discontinuous fibers 11a near the other side 14 extend along this side 14. The discontinuous fibers 11a may be carbon fibers.

Figure 2B:
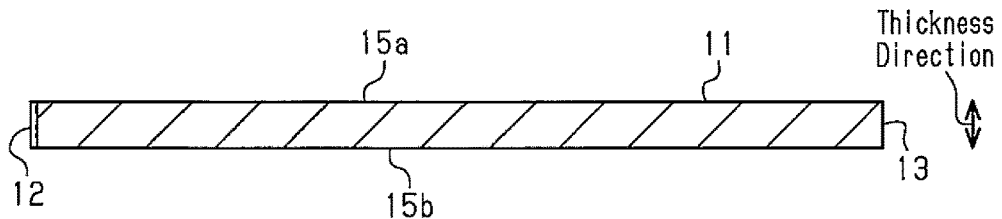
FIG. 2B is a cross-sectional view taken along line 2b-2b in FIG. 2A.
Figure 6:
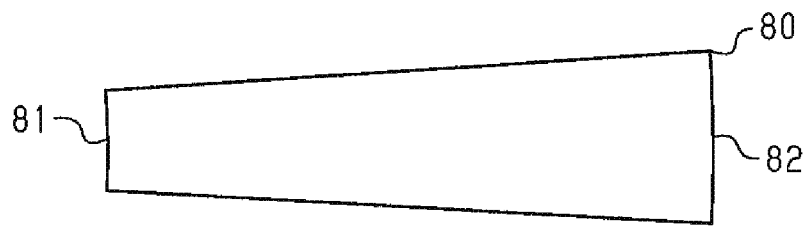
FIG. 6 is a plan view showing a fiber element of the background art.
Figure 7:
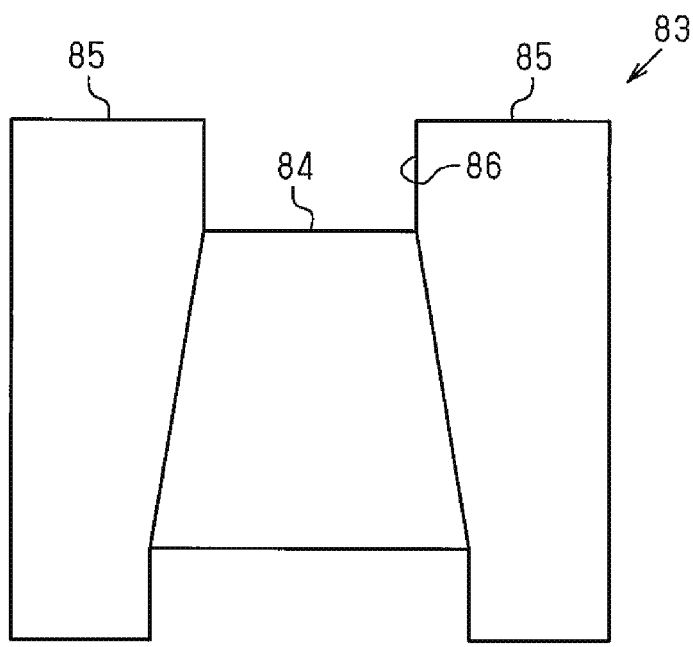
FIG. 7 is a front view of a variable throat for manufacturing a fiber element.

As shown in FIG. 2B, the thickness of the fiber structure 11 is uniform at any positions. Thus, the weight of the discontinuous fibers 11a per unit volume of the fiber structure 11 (hereinafter referred to as density) is also uniform. The fiber structure 11 does not have variances in the alignment of discontinuous fibers 11a or in the physical properties of the fiber structure 11, such as strength and formability, at any positions.

Referring to FIGS. 3A to 5, a manufacturing method and the operation of the fiber structure 11 are now described.

Referring to FIG. 3B, the fiber structure 11 is manufactured using a fiber bundle 40 of discontinuous fibers 11a. The fiber bundle 40 is a material of a uniform width in which discontinuous fibers 11a are aligned.

As shown in FIG. 3A, a preform 16 of the fiber structure 11 (see FIGS. 4A to 5) is formed by stretching the fiber bundle 40 with a drafting apparatus 50. As shown in FIG. 5, the preform 16 is then pressed only in the thickness direction by the press 60 to form the fiber structure 11.

As shown in FIG. 3A, the drafting apparatus 50 includes a conveyor 55 for transferring the fiber bundle 40, a roller unit 51 for receiving and stretching the fiber bundle 40 sent from a delivery conveyor (not shown), and a guide roller 53 for guiding the fiber bundle 40 stretched by the drafting apparatus 50 to the conveyor 55. After passing through the roller unit 51, the fiber bundle 40 is transferred to the conveyor 55 by the guide roller 53. The direction in which the fiber bundle 40 is transferred is referred to as a flow direction X.

The roller unit 51 has a plurality of roller groups 52. Each roller group 52 includes three rollers 52a, 52b, and 52c. The lower roller 52c is placed between the two upper rollers 52a and 52b in each roller group 52. The three rollers 52a, 52b, and 52c of each roller group 52 are driven at the same circumferential velocity so that the fiber bundle 40 is sandwiched and transferred between the lower roller 52c and the upper rollers 52a and 52b. The circumferential velocity of each roller group 52 may be changed individually.

As shown in FIG. 5, the press 60 presses the preform 16, which is made of the fiber bundle 40, only in the thickness direction. The press 60 includes a pair of press rolls 61. The press rolls 61 are supported so that they can rotate and move toward and away from each other. The distance between the press rolls 61 is adjustable by moving the press rolls 61 toward and away from each other.

As shown in FIG. 3A, the fiber bundle 40 is first fed to the drafting apparatus 50 to manufacture the fiber structure 11. The discontinuous fibers 11a in the fiber bundle 40 are aligned in one direction by a given method on the upstream side in the flow direction X.

The roller groups 52 are driven to transfer the fiber bundle 40. When the fiber bundle 40 is transferred, the circumferential velocities of the roller groups 52 are set such that upstream roller groups 52 are driven at a continuously greater circumferential velocity than downstream roller groups 52. Varying the circumferential velocities of the roller groups 52 allows the drafting apparatus 50 to provide a draft ratio that varies continuously.

Consequently, as shown in FIGS. 4A and 4B, the discontinuous fibers 11a are stretched so that the thickness and the width of the fiber bundle 40 decrease gradually toward the downstream side in the flow direction X. The draft ratio of the drafting apparatus 50 decreases toward the upstream side in the flow direction X. Thus, the thickness of a section of the fiber bundle 40 closer to the upstream end is closer to the thickness of the fiber bundle 40 before stretched.

As a result, the fiber bundle 40 is widest at the upstream end in the flow direction X in a plan view, and the thickness at the upstream end is equal to the thickness of the fiber bundle 40 before stretched by the drafting apparatus 50. The width and the thickness of the fiber bundle 40 decrease continuously in the downstream direction. The preform 16 having a sectoral shape in a plan view is thus formed.

The preform 16 has a sectoral shape and is smaller than the fiber structure 11 in a plan view. The preform 16 includes a first pre-pressing arcuate section 17 and a second pre-pressing arcuate section 18. The length of the arc of the second pre-pressing arcuate section 18 is greater than that of the first pre-pressing arcuate section 17. The preform 16 includes a pair of pre-pressing sides 19 connecting the first pre-pressing arcuate section 17 to the second pre-pressing arcuate section 18. The length of the arc of the first pre-pressing arcuate section 17 is less than that of the first arcuate section 12 of the fiber structure 11. The length of the arc of the second pre-pressing arcuate section 18 is less than that of the second arcuate section 13 of the fiber structure 11.

As shown in FIG. 5, the preform 16 formed with the drafting apparatus 50 is passed between the two press rolls 61 of the press 60. The distance between the two press rolls 61 corresponds to the thickness of the first pre-pressing arcuate section 17, which is the thinnest section of the preform 16. The preform 16 is inserted into between the press rolls 61 from the first pre-pressing arcuate section 17, which is narrower.

The preform 16 is gradually compressed as passing between the two press rolls 61. This stretches the first pre-pressing arcuate section 17 and the second pre-pressing arcuate section 18, increasing the lengths of arcs of the first pre-pressing arcuate section 17 and the second pre-pressing arcuate section 18. Consequently, the preform 16 becomes generally wider than the shape before passing through the press 60.

The pressing amount of the preform 16 decreases toward the first pre-pressing arcuate section 17, which is thinner, and increases toward the second pre-pressing arcuate section 18, which is thicker. Thus, a section of the preform 16 closer to the second pre-pressing arcuate section 18 is compressed and extended wider in the width direction. The discontinuous fibers 11a are distributed radially in the preform 16 thus pressed. As a result, all sections of the fiber structure 11 including the top surface 15a and the bottom surface 15b have a uniform density of discontinuous fibers 11a and a uniform thickness.

After manufactured, the fiber structure 11 is impregnated with the thermosetting matrix resin Ma and cured. The resin transfer molding (RTM) method is used to impregnate and cure the matrix resin Ma. The fiber-reinforced composite material 10 including the fiber structure 11 as the reinforcing base is thus manufactured.

The above-described embodiment achieves the following advantages.

(1) The fiber structure 11 is shaped so that the width increases continuously from the first arcuate section 12 to the second arcuate section 13 along the central axis L. All sections of the fiber structure 11 have a uniform density of discontinuous fibers 11a and a uniform thickness. Accordingly, all sections of the fiber structure 11 have the same alignment of fibers and the same physical properties.

When the fiber-reinforced composite material 10 including the fiber structure 11 is used as an impact absorber, an impact load received by the first arcuate section 12 propagates radially toward the second arcuate section 13 along the central axis L. Since all sections of the fiber structure 11 have the same thickness and the density of discontinuous fibers 11a, the impact load propagates gradually in the fiber-reinforced composite material 10. This allows the fiber-reinforced composite material 10 to effectively absorb the impact energy.

(2) The fiber structure 11 is formed by stretching and then pressing the fiber bundle 40. This allows the discontinuous fibers 11a in the fiber structure 11, which has a sectoral shape in a plan view, to be distributed radially and with the same density. As such, the fiber structure 11 is free of a section in which discontinuous fibers 11a are locally concentrated or a section in which discontinuous fibers 11a are locally scarce. That is, the fiber-reinforced composite material 10 does not have a resin-rich section that includes only the matrix resin Ma. This avoids weakening of the fiber-reinforced composite material 10, which would otherwise be caused by a resin-rich section.

(3) The use of different draft ratios in the drafting apparatus 50 enables manufacturing of the preform 16 including the fiber bundle 40 having different thicknesses and widths. Pressing the preform 16 only in the thickness direction with the press 60 reduces variations in thickness while maintaining the uniform density of discontinuous fibers 11a. This allows for manufacturing of the fiber structure 11 that has a sectoral shape in a plan view, has a width that varies continuously, and has a uniform density of discontinuous fibers 11a and a uniform thickness in all sections.

(4) The press 60 includes a pair of press rolls 61. The rotation of the press rolls 61 presses the preform 16 while transferring the preform 16. That is, the pressing of the preform 16 does not require stopping the preform 16. The productivity of the fiber structure 11 is therefore not reduced.

The above-illustrated embodiment may be modified as follows.

An annular fiber-reinforced composite material 10 may be formed by arranging a plurality of fiber structures 11 in an annular shape with the sides 14 of adjacent fiber structures 11 in contact with each other. Further, a cylindrical fiber-reinforced composite material 10 may be formed by layering annular fiber-reinforced composite materials 10. Furthermore, a plurality of fiber structures 11 may be layered in the thickness direction.

The fiber structure 11 may be triangular or trapezoidal in a plan view. That is, the fiber structure 11 may have any shape as long as its width varies continuously along the central axis L.

In the present embodiment, the fiber structure 11 has a sectoral shape in which the central axis L extends in the longitudinal direction, but may have a sectoral shape in which the central axis L extends in the transverse direction.

The fiber structure 11 may include a section in which the width is uniform along the central axis L and a section in which the width varies continuously along the central axis L.

The fiber-reinforced composite material 10 using the fiber structure 11 may be used as a structural material instead of an impact absorber.

The number of the roller groups 52 of the drafting apparatus 50 may be modified.

The entire preform 16 may be compressed simultaneously using a planar press plate.

The invention claimed is:

1. A fiber structure for a fiber-reinforced composite material, which includes a fiber structure of discontinuous fibers and matrix resin impregnated into the fiber structure, the fiber structure comprising a section in which a width varies continuously along a central axis in a plan view,
   wherein, in a section in which the width increases continuously along the central axis, discontinuous fibers are aligned radially along the central axis, and both a thickness of the fiber structure and a density of the discontinuous fibers are uniform.

2. The fiber structure for a fiber-reinforced composite material according to claim 1, wherein, in a plan view, the fiber structure has a sectoral shape having arcuate sections at opposite ends.

3. A fiber-reinforced composite material including a fiber structure and matrix resin impregnated into the fiber structure, wherein the fiber structure according to claim 1 is used.

* * * * *